United States Patent
Sullam et al.

(10) Patent No.: US 8,838,852 B1
(45) Date of Patent: Sep. 16, 2014

(54) PROGRAMMABLE INTERRUPT ROUTING SYSTEM

(75) Inventors: Bert Sullam, Bellevue, WA (US); Haneef Mohammed, Beaverton, OR (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/415,671

(22) Filed: Mar. 8, 2012

Related U.S. Application Data (63) Continuation of application No. 12/773,590, filed on May 4, 2010, now Pat. No. 8,135,884.

(60) Provisional application No. 61/175,077, filed on May 4, 2009.

(51) Int. Cl.
*G06F 13/24* (2006.01)
(52) U.S. Cl.
USPC .............................................. 710/48; 710/266
(58) Field of Classification Search
CPC combination set(s) only.
See application file for complete search history.

(56) References Cited

U.S. PATENT DOCUMENTS

| | | | |
|---|---|---|---|
| 5,598,408 A | 1/1997 | Nickolls et al. | |
| 5,768,598 A * | 6/1998 | Marisetty et al. | 710/260 |
| 5,779,412 A | 7/1998 | Nagai et al. | |
| 5,881,294 A | 3/1999 | Downey et al. | |
| 5,966,047 A | 10/1999 | Anderson et al. | |
| 6,401,156 B1 | 6/2002 | Mergard et al. | |
| 6,493,803 B1 | 12/2002 | Pham et al. | |
| 6,556,952 B1 | 4/2003 | Magro | |
| 6,583,652 B1 | 6/2003 | Klein et al. | |
| 6,724,220 B1 | 4/2004 | Snyder et al. | |
| 6,845,419 B1 * | 1/2005 | Moyer | 710/264 |
| 6,895,530 B2 | 5/2005 | Moyer et al. | |
| 6,971,004 B1 | 11/2005 | Pleis et al. | |
| 7,266,632 B2 | 9/2007 | Dao et al. | |
| 7,287,112 B1 | 10/2007 | Pleis et al. | |
| 7,340,693 B2 | 3/2008 | Martin et al. | |
| 7,360,005 B2 | 4/2008 | Lin | |
| 7,386,646 B2 * | 6/2008 | So et al. | 710/260 |
| 7,552,415 B2 | 6/2009 | Sanchez et al. | |
| 7,609,178 B2 | 10/2009 | Son et al. | |
| 7,613,943 B2 | 11/2009 | Bakker et al. | |
| 8,179,161 B1 | 5/2012 | Williams et al. | |
| 2003/0018892 A1 | 1/2003 | Tello | |
| 2003/0120977 A1 | 6/2003 | Tang | |
| 2007/0214389 A1 | 9/2007 | Severson et al. | |
| 2008/0082713 A1 * | 4/2008 | Tsuruta | 710/268 |
| 2008/0258760 A1 | 10/2008 | Sullam et al. | |
| 2010/0088446 A1 * | 4/2010 | Greb et al. | 710/266 |

OTHER PUBLICATIONS

U.S. Appl. No. 61/175,077 "Non-Blocking Interrupt and DMA Connectivity for a Programmable System on a Chip", filed May 4, 2009; 3 pages.

(Continued)

*Primary Examiner* — Ilwoo Park (57) ABSTRACT

A method and apparatus to operate programmable routing logic comprise receiving, from a fixed function block, a first request, responsive to the first request, forwarding the first request to a first resource of one or more controllers, the first resource allocated to the fixed function block. The method and apparatus further comprise receiving, from a programmable function block, a second request, and responsive to the second request, forwarding the second request to a second resource of the one or more controllers, the second resource allocated to the programmable function block.

20 Claims, 8 Drawing Sheets

(56) References Cited

OTHER PUBLICATIONS

USPTO Non-Final Rejection for U.S. Appl. No. 12/773,590 dated Aug. 3, 2011; 7 pages.
USPTO Notice of Allowance for U.S. Appl. No. 12/773,590 dated Jan. 18, 2012; 12 pages.
U.S. Appl. No. 12/773,801 "Debug Through Power Down," Amsby Richardson Jr et al., Filed May 4, 2010; 120 pages.
U.S. Appl. No. 12/774,680: "Combined Analog Architecture and Functionality in a Mixed-Signal Array," Kutz et al., filed May 5, 2010; 121 pages.
David C. Walter, "Verification of Analog and Mixed-Signal Circuits using Symbolic Methods," A Dissertation Submitted to the Faculty of the University of Utah, Aug. 2007; 134 pages.
Kundert et al., "Design of Mixed-Signal Systems on Chip," IEEE Transactions on CAD, vol. 19, No. 12, Dec. 2000, pp. 1561-1572; 12 pages.
USPTO Advisory Action for U.S. Appl. No. 12/773,801 dated Apr. 25, 2013; 2 pages.
USPTO Final Rejection for U.S. Appl. No. 12/773,801 dated Jan. 23, 2013; 12 pages.
USPTO Final Rejection for U.S. Appl. No. 12/774,680 dated Aug. 3, 2011; 11 pages.
USPTO Non-Final Rejection for U.S. Appl. No. 12/773,801 dated Jun. 22, 2012; 11 pages.
USPTO Non-Final Rejection for U.S. Appl. No. 12/774,680 dated Feb. 18, 2011; 8 pages.
USPTO Non-Final Rejection for U.S. Appl. No. 12/774,680 dated Jul. 10, 2012; 11 pages.
Uspto Non-Final Rejection for U.S. Appl. No. 12/774,680 dated Dec. 22, 2011; 11 pages.
USPTO Notice of Allowance for U.S. Appl. No. 12/774,680 dated Jan. 31, 2013; 7 pages.
USPTO Notice of Allowance for U.S. Appl. No. 12/774,680 dated May 28, 2013; 8 pages.
USPTO Notice of Allowance for U.S. Appl. No. 12/774,680 dated Oct. 22, 2012; 7 pages.
USPTO Non Final Rejection for U.S. Appl. No. 12/773,801 dated Jan. 31, 2014; 14 pages.

\* cited by examiner

PROGRAMMABLE INTERRUPT ROUTING SYSTEM

RELATED APPLICATIONS

This application is a continuation of U.S. patent application No. 12/773,590, filed May 4, 2010, now U.S. Pat. No. 8,135,884, issued Mar. 13, 2012, which claims priority to U.S. Provisional Patent Application No. 61/175,077, filed May 4, 2009, all of which are incorporated by reference herein in their entirety.

TECHNICAL FIELD

The present invention relates generally to interrupt and direct media access (DMA) controllers and, more particularly, to a programmable interrupt routing system.

BACKGROUND

Figure 1A:
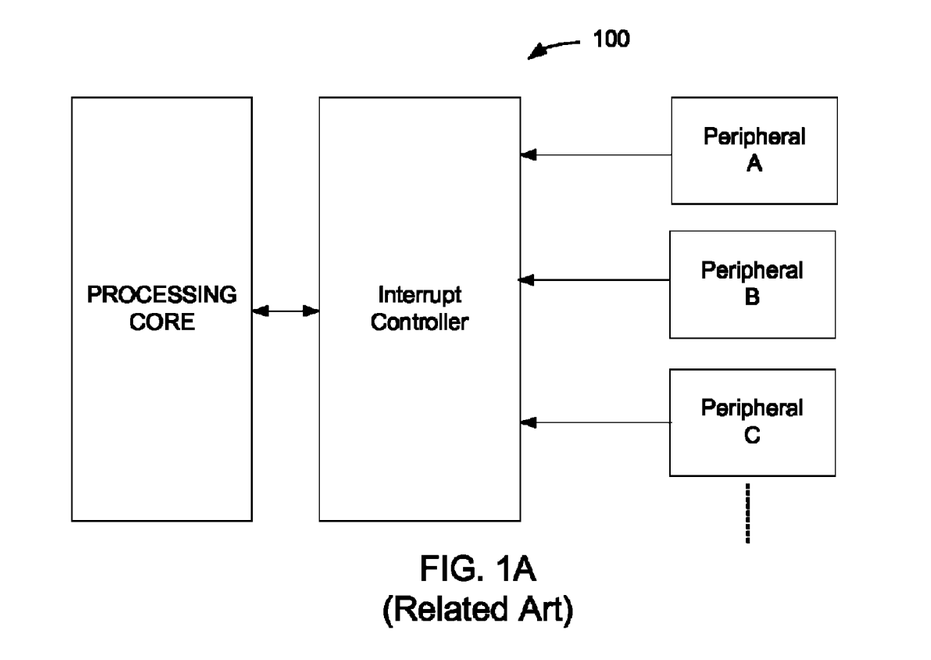
FIG. 1A illustrates a block diagram of a conventional computing system having an interrupt controller coupled between a processing core and multiple peripherals.
Figure 1B:
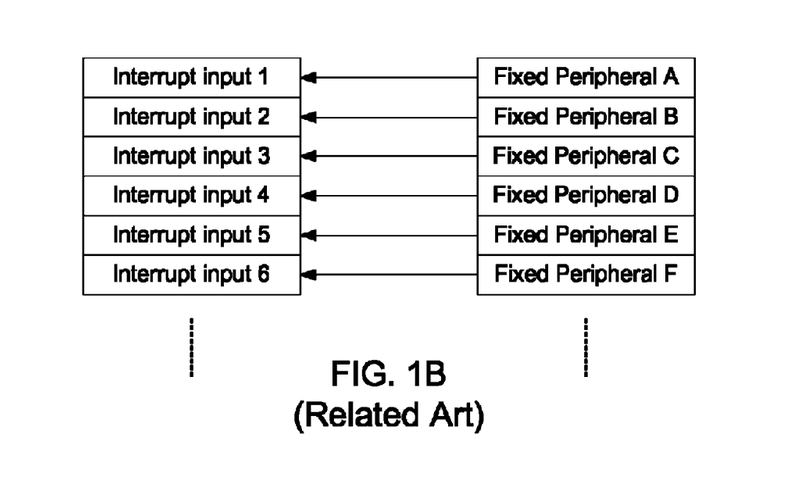
FIG. 1B illustrates a conventional interrupt-mapping scheme of FIG. 1A having a one-to-one mapping between the interrupt input and the peripheral.

In a conventional computing system with a microcontroller, a system interrupt controller has dedicated interrupt inputs to receive dedicated interrupts from each of the available fixed-function peripherals, such as system timers, comparators, analog-to-digital converters (ADCs), etc. For example, FIG. 1A illustrates a block diagram of a conventional computing system having an interrupt controller coupled between a processing core and multiple peripherals. As shown in the figure, three dedicated interrupt inputs receive interrupts from the three fixed-function peripherals A, B, and C, respectively. In the conventional system 100, the interrupts from the fixed-function peripherals are routed to a given interrupt input. Typically, there is a one-to-one mapping, each fixed-function peripheral will use a dedicated interrupt input. FIG. 1B illustrates a conventional interrupt-mapping scheme of FIG. 1A having a one-to-one mapping between the interrupt input and the peripheral.

The conventional technology is inflexible. All interrupt inputs of the interrupt controller are predefined and cannot be changed. As such, users of the conventional system have to tailor their application design to use the interrupt signaling options from the pre-defined peripheral connections.

Another issue with the conventional approach is that the conventional system implements hardware and register support for controlling interrupts for the maximum number of fixed-function peripherals in the system. Some of this support hardware will go to waste because, typically, not all of these interrupts are used; and the ones not being used cannot be reassigned or reused.

In addition, the fixed-function peripherals generate specific waveforms, such as for pulse- or level-triggered events for the interrupts. Thus, the conventional systems that include programmable logic may not receive other signal types as interrupts from the programmable logic, since the interrupt controller expects a pulse- or level-triggered signal at its inputs.

BRIEF DESCRIPTION OF THE DRAWINGS

The present disclosure is illustrated by way of example, and not by way of limitation, in the figures of the accompanying drawings.

DETAILED DESCRIPTION

A method and apparatus for a programmable interrupt routing system is described. In one embodiment, a controller having a fixed number of interrupt inputs is coupled to the programmable routing system, and the programmable routing system is configured to receive user input to select between a dedicated connection and a programmable connection for routing the interrupt requests from multiple interrupt sources to the controller. For example, a design tool allows the user to select between a dedicated connection and a programmable connection for each of the fixed number of interrupt inputs for routing the interrupt requests to the controller. The selections between the dedicated and programmable connections are permutable (i.e., the generic, non ordinal connections, which means they are all equivalent and no implicit ordering). In one embodiment, the programmable routing system is configured to assign a first set of dedicated connections for a first set of interrupt inputs to receive interrupts from a set of one or more fixed-function peripherals. The first set of interrupt inputs is less than the fixed number of interrupt inputs. The programmable routing system assigns each of the remaining inputs a programmable connection to receive programmable interrupt requests from other interrupt sources, such as signals from a programmable logic array.

As described above, given a system on a semiconductor chip, including a microcontroller, fixed-function blocks (e.g., fixed-function peripherals), and programmable logic blocks, conventionally there is no way to provide flexible, non-blocking interrupt and DMA request connectivity when the system has more potential interrupt request sources than available interrupt inputs on the interrupt controller. In addition to providing fixed-function interrupt and DMA request connectivity, such as described in the conventional one-to-one mapping scheme of FIGS. 1A and 1B, the embodiments described herein can also provide, permutable connectivity through the programmable routing system, which may be implemented in the programmable logic blocks of a programmable logic array. For example, the programmable routing system can program a certain number of fixed-function peripherals to have a dedicated connection that provides a dedicated route to the interrupt controller. The programmable routing system can also program additional programmable routes so that additional interrupts from the programmable logic can be implemented along with the fixed-function interrupts.

As described above, the fixed-function peripherals generate specific waveforms (for example, a pulse triggered, or level triggered event). Using the embodiments described herein, the programmable routing system can receive any type of signal and preprocess the signal to one of the specific waveforms expected by the interrupt controller before sending the interrupt to the interrupt controller.

Using the embodiments described herein, any signal can be an interrupt source, and both the dedicated connections and the programmable connections are permutable. For example, the programmable routing system can receive interrupts from fixed-function peripherals, as well as any programmable logic interrupt sources (e.g., any programmable wire), and route them to the interrupt controller through the permutable connections. The combination of fixed-function interrupts and programmable interrupts is application dependent and may be determined by the user of the system. Given a total number of interrupts in the system, the user can use the programmable routing system to freely make the tradeoff between X number of fixed-function interrupts used, and Y number of interrupts routed from the programmable logic array. This allows the system to support more interrupt sources than the fixed number of interrupt inputs of the interrupt controller up to the limit of the available interrupt inputs. The embodiments described herein provide non-blocking interrupt and DMA request connectivity using permutable connectivity using the programmable routing system.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

References in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 2A:
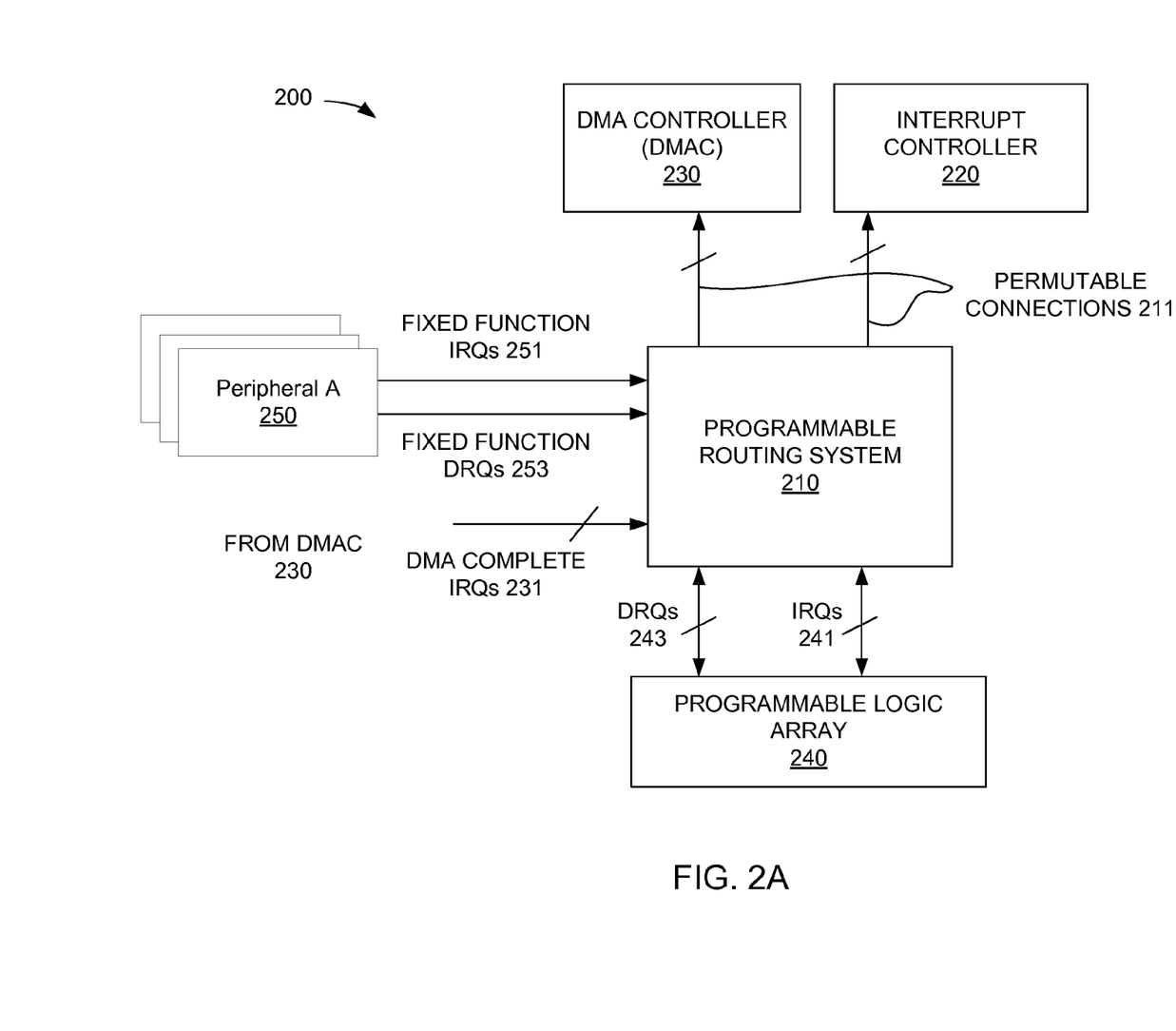
FIG. 2A illustrates a block diagram of a programmable routing system coupled to an interrupt controller and a direct memory access (DMA) controller according to one embodiment.

FIG. 2A illustrates a block diagram of a programmable routing system 210 coupled to an interrupt controller 220 and a direct memory access (DMA) controller 230 according to one embodiment. The computing system 200 includes the programmable routing system 210, interrupt controller 220, DMA controller 230, and the programmable logic array 240. In one embodiment, the programmable routing system 210 is a programmable routing matrix, implemented in the programmable logic array 240. Alternatively, the programmable routing system 210 may be implemented as another form of logic that is inside or outside the programmable logic array 240.

In the depicted embodiment, the programmable routing system 210 provides programmable routing (e.g., programmable multiplexing) for the interrupt request inputs of the interrupt controller 220 and for DMA request inputs of the DMA controller 230. In the depicted embodiment, each interrupt input has three possible sources: fixed-function peripherals, signals from the programmable logic array 240, and DMA complete IRQs from the DMA controller 230. In another embodiment, the signals from the programmable logic array 240 can be routed as level (unprocessed), or with edge detect processing. Similarly, the DMA inputs may include fixed-function peripherals, level signals from the programmable logic array 240, and signals with edge detected processing from the programmable logic array 240. The programmable routing system 210 may also contain static configuration registers to determine the source for each Interrupt Request (IRQ) or DMA request (DRQ) received. The programmable routing system 210 programs the static configuration registers based on the user input to program the dedicated and programmable connections for each of the inputs.

For example, in the depicted embodiment, the programmable routing system 210 receives fixed-function IRQs 251 and fixed-function DRQs 253 from one or more fixed-function peripherals 250, DMA complete IRQs 231 from the DMA controller 230, and IRQ 241 and DRQ 243 from the programmable logic array 240. The programmable routing system 210 is configured to program permutable connections 211 to route the interrupt requests from the various sources to the interrupt controller 220 and the DMA controller 230 appropriately. In one embodiment, the programmable routing system 210 receives user input to select between a dedicated connection and a programmable connection for each of the interrupt inputs of the interrupt controller 220 and the DMA inputs of the DMA controller 230 for routing the interrupt requests and DMA requests accordingly. The interrupt controller 220 and the DMA controller 230 have a fixed number of inputs. In one embodiment, the programmable routing system 210, based on the user input configuration, selects between a dedicated connection and a programmable connection for each of the fixed number of inputs. The user's selections between dedicated and programmable are permutable.

In another embodiment, the programmable routing system 210 is configured to first assign a first set inputs dedicated connections for interrupts (e.g., 251 and 253) from the fixed-function peripherals 250. The first set is less than the fixed number of interrupt inputs of the interrupt controller 220, for example. The programmable routing system 210 then assigns each of the remaining inputs a programmable connection to receive a programmable interrupt request from one of the other sources, such as for the IRQ 241 and DRQs 243 from the programmable logic array 240. Similarly, the programmable routing system 210 can assign a dedicated connection for the DMA complete IRQs 231 from the DMA controller 230.

In one embodiment, the programmable routing system 210 receives inputs from three different types of interrupt sources, including fixed-function interrupts, DMA interrupts, and interrupts from the programmable logic array 240. In one embodiment, the programmable routing system 210 can be programmed to assign the fixed-function interrupts dedicated connections to the most common interrupt sources and provide the lowest resource cost connection, such as some of the fixed-function peripherals. The fixed-function peripherals may be internal interrupt sources, such as system timers, analog comparators, signals from the programmable logic array 240, hardware resources, or the like. In another embodiment, the programmable routing system 210 can assign interrupt sources from the programmable logic array 240 as programmable connections. This allows any digital signal available to the programmable logic array 240 to be useable as an interrupt source. It should be noted that the programmable routing system 210 can also receive pre-processed interrupts from the pre-processing logic 320 which is described with respect to FIG. 3 and or from the edge detect logic 420 described with respect to FIG. 4.

In one embodiment, the programmable routing system 210 provides multiplexers that select between the fixed-function inputs and those generated in the programmable logic array 240 for the interrupt controller 220 as described in more detail below with respect to FIG. 4. In another embodiment, the programmable routing system 210 provides more multiplexers that select between the fixed-function inputs and those generated in the programmable logic array 240, or received from the DMA controller 230. Alternatively, the width of the multiplexer(s) could be variable to include other permutable interrupt sources than those described herein. In another embodiment, the programmable routing system 210 includes an M-to-1 multiplexer at each interrupt input, where M is the number of possible interrupts in the computing system 200. This may be less inefficient from a hardware perspective as compared to other embodiments described herein, which M is not a fixed number since any signal in the programmable routing can be used as an interrupt. This programmable routing scheme in the described embodiments gives users transparent access to maximum use of interrupt resources in the computing system 200. It also allows software tools to flexibly allocate interrupts, with virtually no constraints.

The programmable routing system 210 may receive level-sensitive interrupts (e.g., FIFO status, array status registers), pulse interrupts, arbitrary synchronous waveform interrupts, or the like. In one embodiment, the programmable routing system 210 includes a pre-processing logic, which is illustrated and described with respect to FIGS. 3 and 4, which can perform condition signaling in an interface block or in the programmable logic array 240. For example, the pre-processing logic can perform synchronization for the interrupts being sent to the interrupt controller 220 (or DMA controller 230), or can perform edge detection. The edge detection logic may receive an arbitrary synchronous waveform and convert a positive edge of the arbitrary synchronous waveform into a synchronous pulse, such as a one-cycle bus clock pulse, for example (e.g., pulse width modulators (PWMs) and global digital clocks). For another example, the edge detection logic may receive an IRQ from the programmable logic array 240 and convert the IRQ (or DRQ) into a pulse IRQ (or pulse DRQ).

In one embodiment, the programmable routing system 210 receives user input to allocate the interrupts according, for example, first assigning the fixed peripherals that are going to be used, and next, assigning the unused inputs with the programmable sources. For example, if the fixed-function IRQ is needed, the programmable routing system 210 programs a dedicated route similar to the conventional approach, but also allocates the remaining inputs to interrupt requests generated in the programmable logic array 240 and from other routed sources (e.g., DMA controller 230). Because the inputs are permutable using the programmable routing system 210, the ordering of the interrupt requests does not matter for the programmable sources, since the user can set the priorities of the interrupt individually. In another embodiment, if there are N available interrupts available in the system. As a first step, the users would select from the set of fixed function peripherals that have dedicated connections. The number of dedicated connections could be from 0 to N. It's unlikely to be either 0 or N but some number in between, say M dedicated connections. The user would then be able to allocate the remaining N-M inputs to the programmable connections.

Signals on these programmable connections will originate from functions that are mapped into the programmable logic array 240, or any other system signal that is routed in the programmable logic array 240. In response to the user's selections, the programmable routing system 210 receives the corresponding user input of the user's selections and programs the multiplexers accordingly to map the dedicated connections and programmable connections to the corresponding interrupt inputs. Given an interrupt controller (or DMA controller) in a programmable system on a chip, the programmable routing system 210 multiplexes each interrupt input between dedicated peripheral inputs, and programmable routing. Connecting interrupt inputs to the programmable routing system 210 enables the system on a chip to achieve 100% utilization of the available interrupt resources. Application designers have a very high degree of flexibility when allocating system interrupts using the programmable routing system 210. As mentioned above, no interrupt input will go unused if needed in a given application. This will result in higher silicon efficiency. In addition, due to the permutable nature of the programmable routing, software tools can be used to route interrupts transparent to users of the device. Virtually any routed signal can be used as an interrupt input and software tools may be used to allocate and route these signals.

Figure 7:
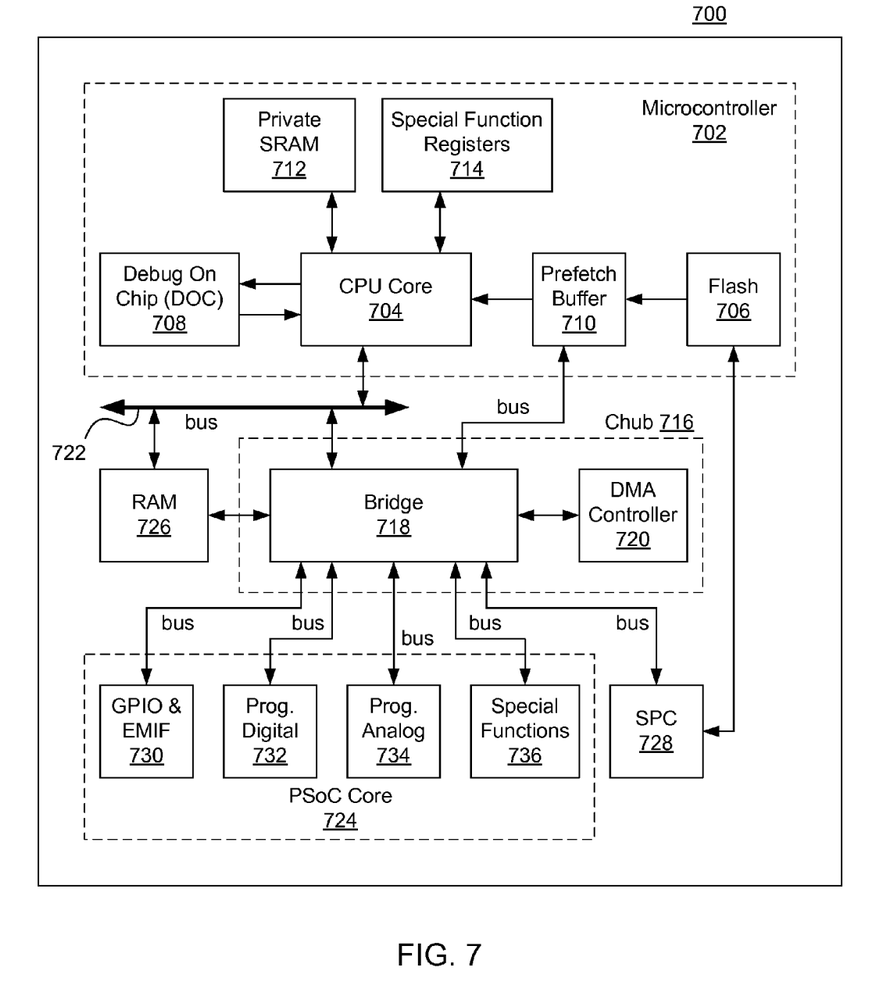
FIG. 7 illustrates an embodiment of a core architecture of the Programmable System-on-Chip (PSoC®) processing device.

In one embodiment, the computing system 200, in which the programmable routing system 210 is implemented, is a programmable system on a chip. The computing system 200 may be the Programmable System on a Chip (PSoC®) processing device, developed by Cypress Semiconductor Corporation, San Jose, Calif. FIG. 7 illustrates one embodiment of a core architecture of the PSoC® processing device. Alternatively, the computing system 200 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), a complex programmable logic device (CPLD), or the like. In an alternative embodiment, for example, the computing system 200 may be a network processor having multiple processors including a core unit and multiple microengines. Additionally, the computing system 200 may include any combination of general-purpose processing device(s) and special-purpose processing device(s).

Figure 2B:
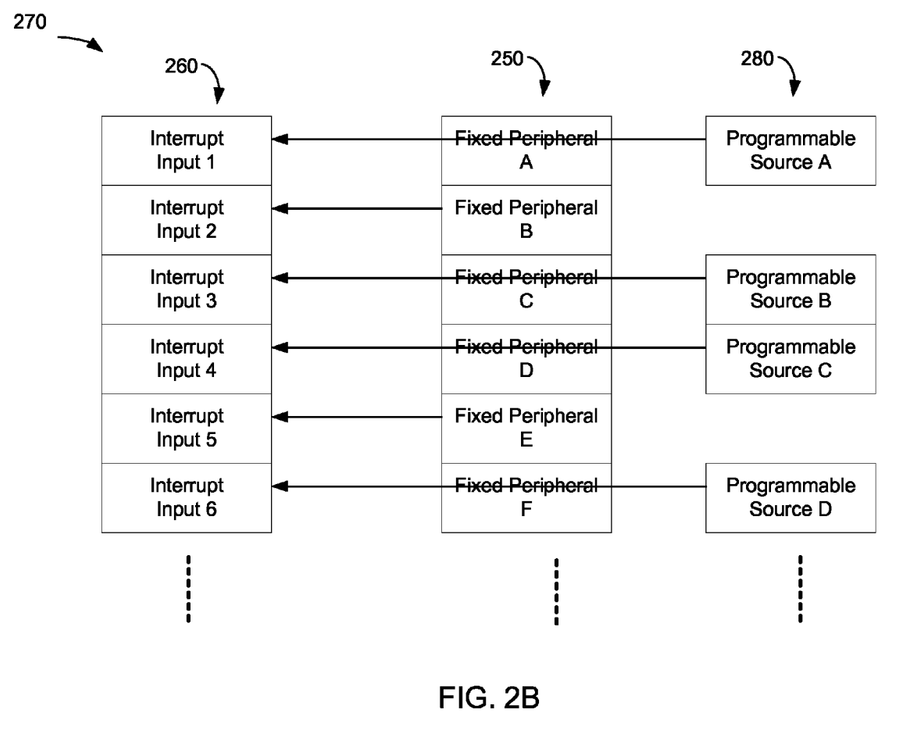
FIG. 2B illustrates one embodiment of an interrupt-mapping scheme of the programmable routing system of FIG. 2A having permutable mappings between the interrupt inputs and the interrupt sources.

FIG. 2B illustrates one embodiment of an interrupt-mapping scheme 270 of the programmable routing system 210 of FIG. 2A having permutable mappings between the interrupt inputs and the interrupt sources. The interrupt-mapping scheme 270 includes the mappings between the fixed number of interrupt inputs 260 and the fixed-function peripherals 250 and the programmable sources 280. In this exemplary mapping, the programmable routing system 210 assigns the fixed-function peripherals B and E dedicated connections to the interrupt inputs 2 and 5, respectively. The programmable routing system 210 assigns the programmable sources A, B, C, and D programmable connections to the interrupt inputs 1, 3, 4, and 6, respectively. In addition, because the interrupt inputs are permutable using the programmable routing system 210, the programmable routing system 210 can reassign the interrupt inputs 260, such as in response to user input, various combinations of fixed-function peripherals 250 and programmable sources 280.

In another embodiment, the programmable routing system 210 can receive multiple request from one of the sources described above, such as the peripherals 250, the DMA controller 230, the programmable logic array 240, and can route one or more of these interrupt requests to the programmable logic array 240. The programmable logic array 240 may generate an interrupt requesting using the one or more interrupt requests received from the programmable routing system 210. For example, the programmable logic array 240 may include combinatorial logic that checks if an IRQ 251 has been received from a specific peripheral 250, and if an output signal of a comparator, implemented in the programmable logic array 240 is asserted. Based on these two conditions, the programmable logic array 240 generates an interrupt request and sends the interrupt request back to the programmable routing system 210 to be routed to the interrupt controller 220 (or the DMA controller 230). This may allow the programmable logic array 240 to generate, for example, a hybrid, fixed-function and programmable interrupt request that is based on at least one interrupt received from one of the peripherals and any available signal of the programmable logic array 240. This may allow the programmable logic array 240 to further define when to route the interrupt request to the interrupt controller 220 or the DMA controller 230. Alternatively, other processing can be performed by the programmable logic array 240 to generate the interrupt request as would be appreciated by one of ordinary skill in the art having the benefit of this disclosure. It should be noted that the lines between the programmable routing system 210 and the programmable logic array 240 have been designated as bi-directional to indicate that in some embodiments, the programmable routing system 210 can route interrupts to the programmable logic array 240 for further processing, as well as receive interrupt requests from the programmable logic array 240. However, in other embodiments, separate buses or connections can be used to communicate the interrupt requests between the programmable routing system 210 and the programmable logic array 240.

Figure 3:
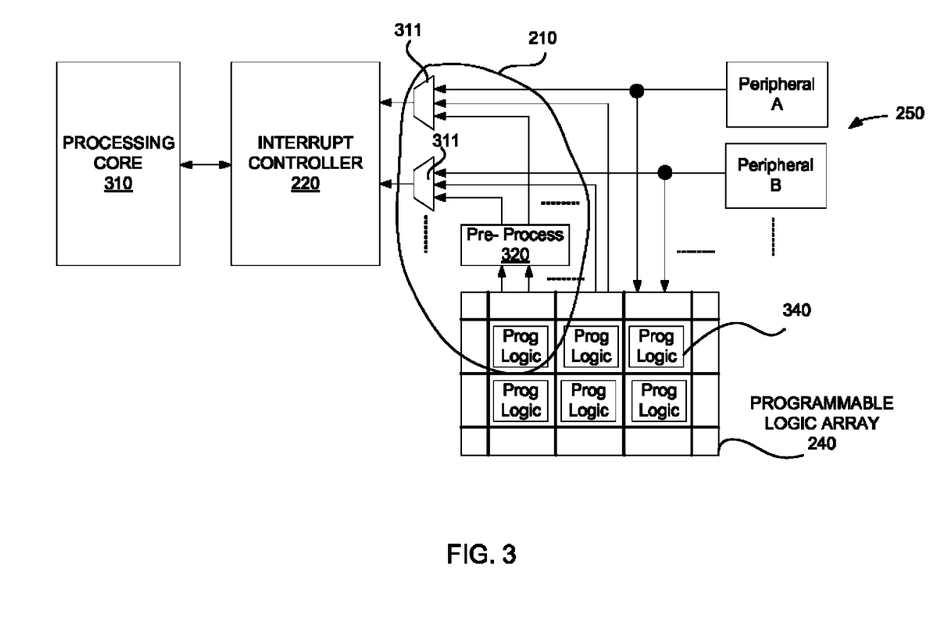
FIG. 3 illustrates a block diagram of the programmable routing system of FIG. 2A implemented in programmable logic of a programmable logic array according to one embodiment.

FIG. 3 illustrates a block diagram of the programmable routing system 210 of FIG. 2A implemented in programmable logic of the programmable logic array 240 according to one embodiment. In the depicted embodiment, the programmable routing system 210 is implemented at least partially using programmable logic blocks 340 of the programmable logic array 240. The programmable routing system 210 includes a pre-processing logic 320 and a multiplexer 311 for each of the interrupt inputs of the interrupt controller 220. The multiplexer 311 receives one input from a fixed-function peripheral 250, an inputs from the pre-processing logic 320, and/or one or more inputs from the programmable logic array 240 directly. For example, a design tool allows the user to program the multiplexer 311 of the programmable routing system 210 to select between a dedicated connection between the peripheral A and the interrupt controller 220, and a programmable connection between either the pre-processing logic 320 or the programmable logic array 240 directly and the interrupt controller 220. For example, in one embodiment, the programmable routing system 210 programs the first multiplexer 311 to have a dedicated connection with the peripheral A 250. In this case, when the multiplexer 311 receives a fixed-function interrupt from the peripheral A, the multiplexer 311 routes the interrupt to the interrupt controller on the first input. The interrupt controller 220 processes the interrupt and communicates with the processing core 310 accordingly. The pre-processing logic 320 can perform signal conditioning in an interface block, or alternatively, in the programmable blocks 340 of the programmable logic array 240. The pre-processing logic 320 can perform synchronization and/or edge detect operations to pre-process the interrupts. For example, the pre-processing logic 320 can convert the signal received from the programmable logic array 240 into a pulse or level interrupt, which is expected by the interrupt controller 220.

In another embodiment, the programmable routing system 210 programs a second multiplexer 311 to have a programmable connection that receives a pre-processed interrupt from the pre-processing logic 320. This interrupt may originate from a fixed-function peripheral, such as peripheral B, which is routed through the programmable logic array 240, and processed by one or more processing logic blocks 340, as well as the pre-processor logic 320. Alternatively, the interrupt may originate from the processing logic blocks 340 in the programmable logic array 240. In another embodiment, the programmable routing system 210 programs the second multiplexer 311 to have a programmable connection that receive an unprocessed interrupt from the programmable logic array 240. In one embodiment, the programmable routing system 210 is a programmable routing matrix that is implemented in the programmable logic blocks 340 of the programmable logic array 240. Alternatively, the programmable routing system 210 can be implemented in other logic of the computing system 200.

In addition to the fixed function peripherals that can generate interrupt requests, any data signal in the programmable logic array's routing, can also be used to generate an interrupt or DMA request. A high-level view of the interrupt and DMA multiplexing (IDMUX) routing is shown in FIG. 4. The IDMUX selects from the available sources of interrupt requests. In one embodiment, the IDMUX is a standalone block outside of the programmable logic array 240. Alternatively, the IDMUX may be at least partially implemented in the programmable logic array 240.

Figure 4:
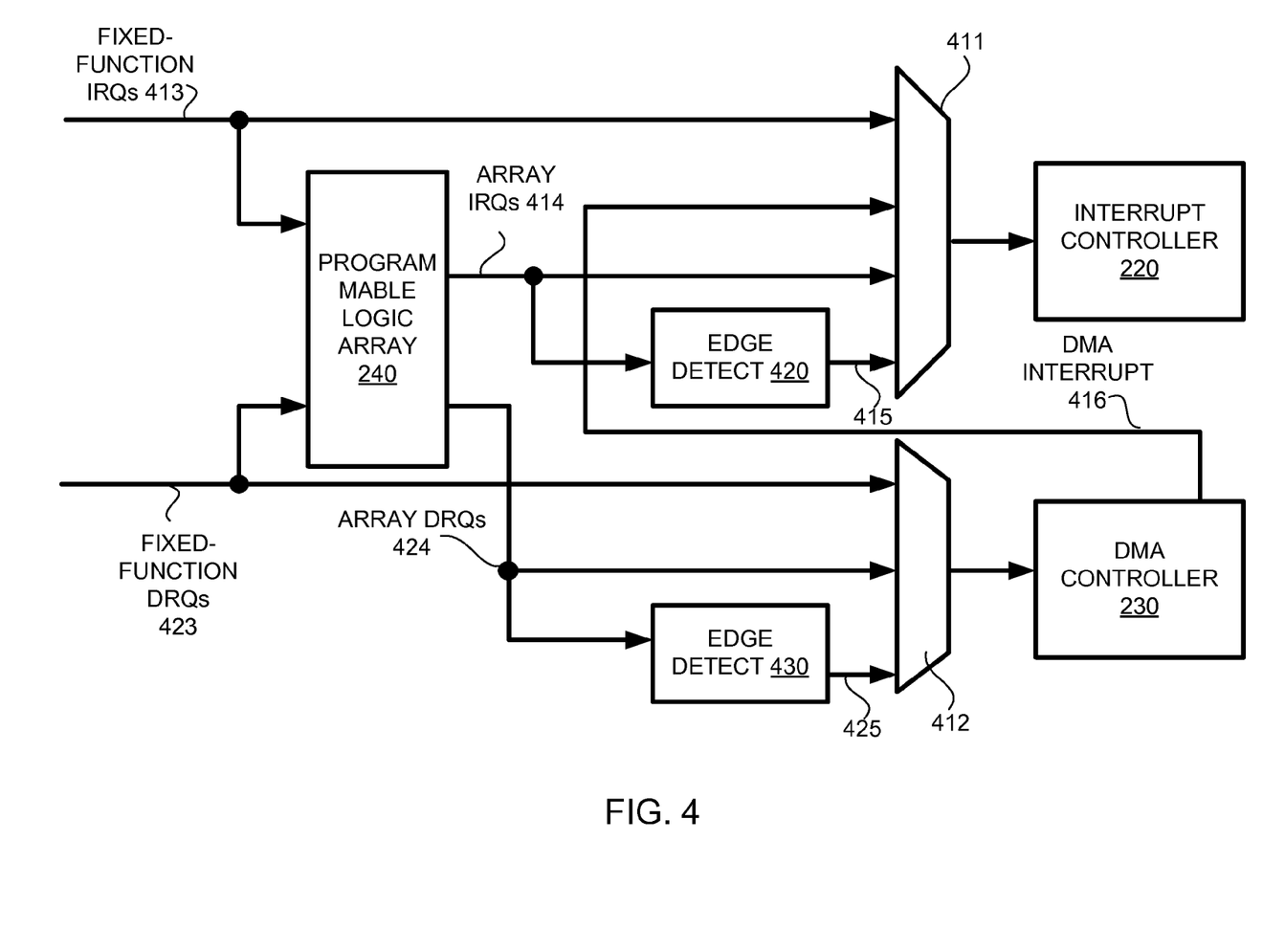
FIG. 4 illustrates a block diagram of two multiplexers for each input of the interrupt controller and DMA controller of FIG. 2A according to one embodiment.

FIG. 4 illustrates a block diagram of two multiplexers 411 and 412 for each input of the interrupt controller 220 and the DMA controller 230 of FIG. 2A according to one embodiment. The multiplexer 411 can select each interrupt input from one of four sources: 1) fixed-function interrupts 413 (e.g., fixed-function IRQs), generated from fixed-function peripherals, like system timers, comparators, ADCs, I2C, timer counters, DMA controller, I/O port pins, digital-to-analog converters (DACs), delta sigma modulators, global clocks, Sleep, reset inputs, UARTS (Universal Asynchronous Receiver Transmitter), CAN (Controller Area Network), PLD (Programmable Logic Device) inputs, PICU (Port Interrupt Control Unit), SC (Switch Capacitor) blocks, or the like. 2) Level interrupts 414 from the programmable logic array 240 (e.g., array IRQs), for example, from status registers or First-in-First-Out (FIFO) queues. 3) Edge interrupts 415 generated by the edge detect logic 420, such as interrupts that have been converted from arbitrary synchronous waveforms, such as clocks and PWMs. For example, the edge detect logic 430 can convert the array IRQ 414 into a pulse IRQ. 4) DMA controller interrupts 416, which may be a signal indicating the end of a sequence of DMA actions by the DMA controller 230. These signals may be pulse bus-clock waveforms. In addition, the fixed-function interrupts 413 may be level or bus clock pulse waveforms.

The purpose for the fixed-function interrupt multiplexing is to allow selected interrupt sources to bypass the programmable logic array routing. There may be two reasons for this: 1) To allow for cases when there are short wake up periods from sleep, where programmable logic array functionality is not required and therefore the interrupt can be handled directly without powering up the programmable logic array 240 and its associated routing. 2) Using the direct route reduces stress on the routing interface for the programmable logic array.

In another embodiment, the programmable routing system includes a second multiplexer 412 for each DMA inputs of the DMA controller 230. The multiplexer 412 can select each interrupt input from one of three sources: 1) fixed-function interrupts 423 (e.g., fixed-function DRQs), generated from a fixed-function peripherals, like I2C, Sleep, CAN, PICU, or the like. 2) Level interrupts 424 from the programmable logic array 240 (e.g., array DRQs), for example, from status registers or FIFOs. 3) Edge interrupts 425 generated by the edge detect logic 430, such as interrupts that have been converted from arbitrary synchronous waveforms, such as clocks and PWMs. For example, the edge detect logic 430 can convert the array DRQ 424 into a pulse DRQ.

As described herein, the multiplexers 411 and 412 (collectively referred to as the IDMUX) may handle three types of interrupts and DMA waveforms: 1) Level Interrupts, for example, an IRQ/DRQ source that is "sticky," which means the source remains active until firmware clears the source of the request with an action (e.g., clear on read). Most fixed-function peripherals have level-sensitive interrupts, including FIFO status and status registers for the programmable logic array 240. 2) Pulse interrupts, for example, interrupts where the IRQ/DRQ is a single bus clock pulse, which logs a pending action and insures that the ISR or DMA action will only be executed once. 3) Edge interrupt, for example, an interrupt is a synchronous one cycle bus clock pulse converted from a positive edge of an arbitrary, synchronous waveform that is input to the edge detect circuit (e.g., 420 or 43). Examples of this type of source are PWMs and global digital clocks. It should be noted that in FIG. 4, the IRQs/DRQs 413 and 423, which may be routed through the programmable logic array 240 may be arbitrary waveforms that can take advantage of the edge detect logic 420 (or 430), whereas the fixed-function interrupts that are not routed through the programmable logic array 240 may be level or pulse interrupts. The DMA interrupts 416 may be pulse interrupts by design.

In one embodiment, using the multiplexer 411 of the programmable routing system 210, the interrupt inputs are permutable to a first order because first level priority can be set independently, making all inputs essentially equivalent. This means that the set of fixed function interrupts may be allocated first, then array interrupts 414 and 415, then DMA interrupts 416 can fill the remaining vacancies of interrupt inputs. The array interrupts 414 and 415 may be constrained by the available routing to a given interrupt, whereas DMA interrupts 415 are completely flexible in that any index can be mapped to any DMA channel output interrupt. In another embodiment, using the multiplexer 412 of the programmable routing system 210, the DMA inputs are permutable to a first order. The DMA inputs may be assigned priority independent of order, making the inputs essentially equivalent. This means that the set of fixed-function DMA inputs 423 may be allocated first, then array DRQs 424 and 425 can fill the remaining vacancies of DMA inputs.

Figure 5:
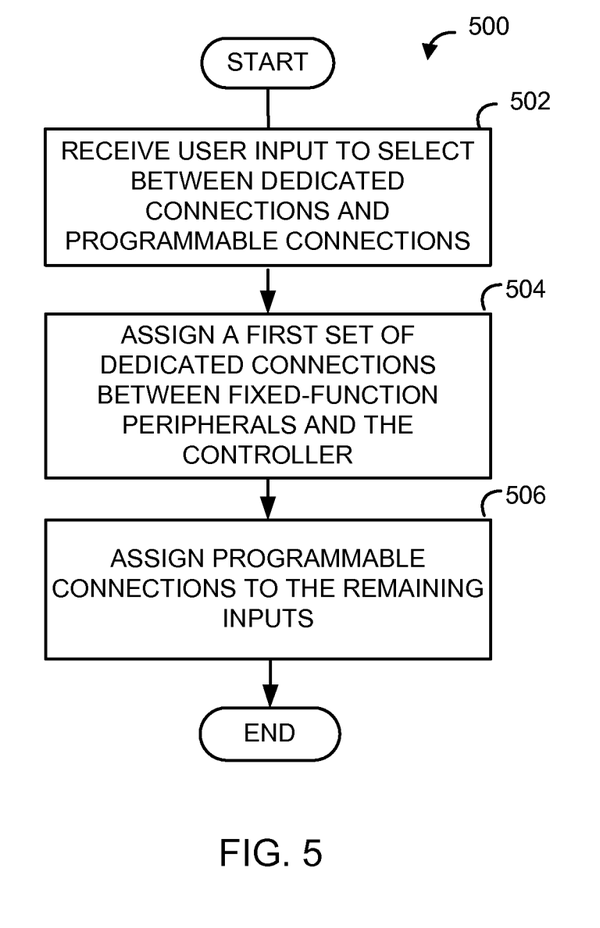
FIG. 5 illustrates a flow diagram of one embodiment of a method of programmable interrupt routing.

FIG. 5 illustrates a flow diagram of one embodiment of a method 500 of programmable interrupt routing. The method 500 is performed by processing logic that may comprise hardware (circuitry, dedicated logic, etc.), software (such as is run on a general purpose computer system or a dedicated machine), firmware (embedded software), or any combination thereof. In one embodiment, the programmable routing system 210 of FIG. 2A performs the method 500. Alternatively, other components of the computing system 200 may perform some or all of the operations of the method 500.

Referring to FIG. 5, processing logic begins with receiving, at a programmable routing system, user input configuration data to select between a dedicated connection and a programmable connection for routing interrupts from the interrupt sources to a controller (e.g., interrupt controller 220 or DMA controller 230), the controller having a fixed number of interrupt inputs (block 502). Next, the processing logic, based on the user input configuration data, selects between a dedicated connection and a programmable connection for each of the fixed number of interrupt inputs. In the depicted embodiment, the connections are selected by assigning a first set of one or more dedicated connections between a corresponding set of one or more of the interrupt sources (e.g., fixed-function peripherals) and the controller (block 504). Each of the corresponding set of the interrupt sources is a fixed-function peripheral. The first set of dedicated connections may be less than the fixed number of interrupt inputs. Next, for each of the remaining inputs of the fixed number of interrupt inputs, the processing logic assigns a programmable connection to receive programmable interrupt requests from the remaining interrupt inputs (block 506). Each of the remaining interrupt inputs can be assigned programmable sources.

In one embodiment, after the dedicated and programmable connections have been selected, the processing logic receives an interrupt at the programmable routing system from one of the interrupt sources, and routes the interrupt to the controller over one of the connections. For example, the processing logic routes the interrupt to the controller over one of the dedicated connections when the interrupt is from one of the fixed-function peripherals and over one of the programmable connections when the interrupt is from one of the programmable sources.

In other embodiment, the processing logic performs various operations as described above with respect to FIGS. 2A-4.

Figure 6:
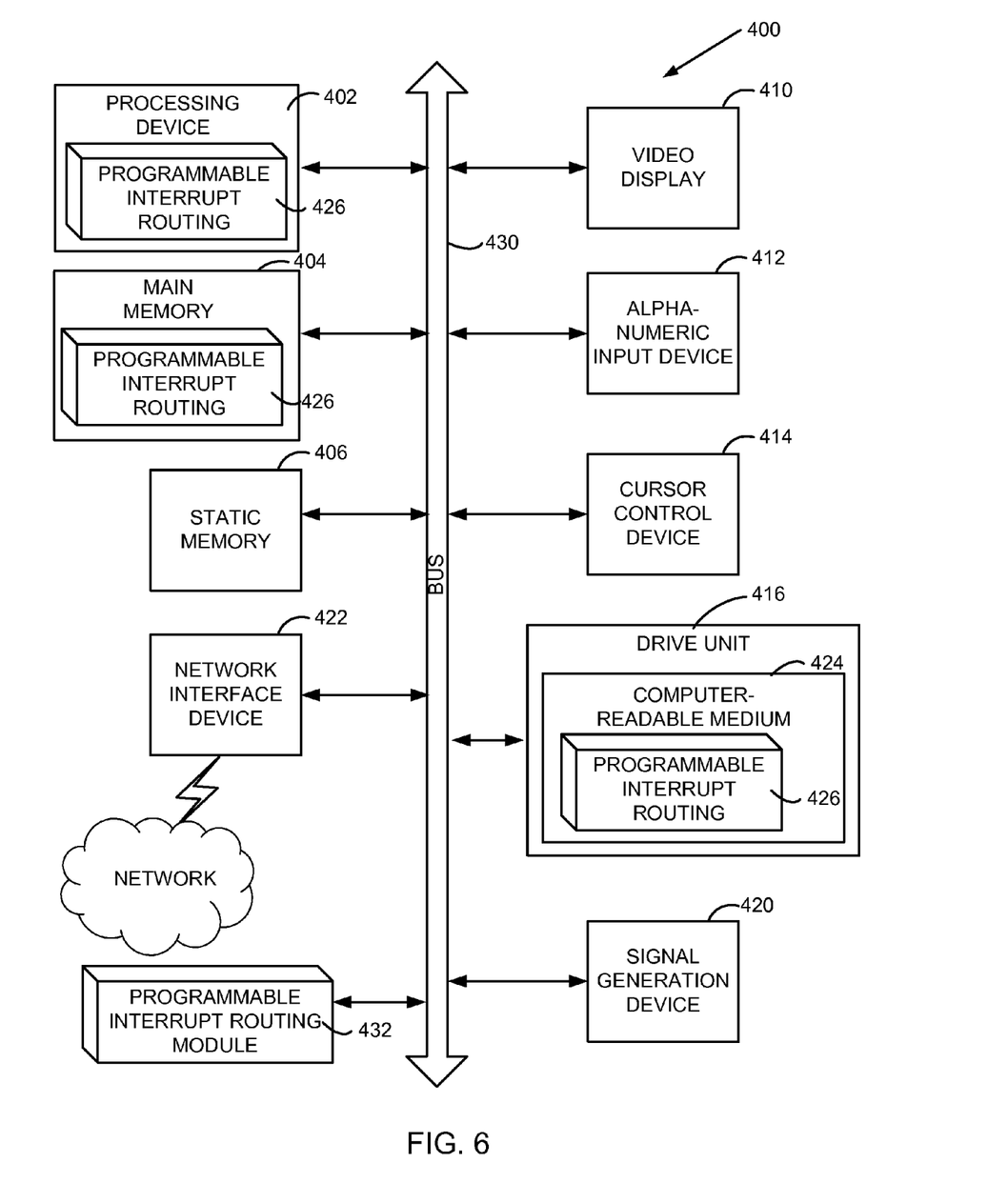
FIG. 6 illustrates a diagrammatic representation of a machine in the exemplary form of a computer system for programmable interrupt routing.

FIG. 6 illustrates a diagrammatic representation of a machine in the exemplary form of a computer system 600 for programmable interrupt routing. Within the computer system 600 is a set of instructions for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a STB, a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for operations of programmable interrupt routing, such as the method 500 described above. In one embodiment, the computer system 600 represents various components that may be implemented in the computing system 200 as described above. Alternatively, the computing system 200 may include more or less components as illustrated in the computer system 600.

The exemplary computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 616, each of which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic (e.g., programmable interrupt routing 626) for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions (e.g., programmable interrupt routing 626) embodying any one or more of the methodologies or functions described herein. The programmable interrupt routing 626 may also reside, completely or at least partially, within the main memory 604 and/or within the processing device 602 during execution thereof by the computer system 600, the main memory 604 and the processing device 602 also constituting computer-readable storage media. The programmable interrupt routing 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The programmable interrupt routing 632, components, and other features described herein (for example in relation to FIGS. 2A-4) can be implemented as discrete hardware components or integrated in the functionality of hardware components such as ASICS, FPGAs, DSPs or similar devices. In addition, the programmable interrupt routing module 632 can be implemented as firmware or functional circuitry within hardware devices. Further, the programmable interrupt routing module 632 can be implemented in any combination hardware devices and software components.

FIG. 7 illustrates an embodiment of a core architecture 700 of the PSoC® processing device, such as that used in the PSoC3® family of products offered by Cypress Semiconductor Corporation (San Jose, Calif.). In one embodiment, the core architecture 700 includes a microcontroller 702. The microcontroller 702 includes a CPU (central processing unit) core 704, flash program storage 706, DOC (debug on chip) 708, a prefetch buffer 710, a private SRAM (static random access memory) 712, and special functions registers 714. In an embodiment, the DOC 708, prefetch buffer 710, private SRAM 712, and special function registers 714 are coupled to the CPU core 704, while the flash program storage 706 is coupled to the prefetch buffer 710.

The core architecture 700 may also include a CHub (core hub) 716, including a bridge 718 and a DMA controller 720 (e.g., DMA controller 230), that is coupled to the microcontroller 702 via bus 722. The Chub 716 may provide the primary data and control interface between the microcontroller 702 and its peripherals (e.g., peripherals 250) and memory, and a programmable core 724. The DMA controller 720 may be programmed to transfer data between system elements without burdening the CPU core 704. In one embodiment, the interrupt controller 220 and the programmable routing system 210 can be implemented in the Chub 716 to also provide additional data and control interfaces between the microcontroller 702 and its peripherals (e.g., 250), as well as other interrupt sources, such as GPIO & EMIF 730, the programmable logic array 240, or the like. Alternatively, the interrupt controller 220, the DMA controller 230, and/or the programmable routing system 210 can be implemented in other configurations as would be appreciated by one of ordinary skill in the art having the benefit of this disclosure. In various embodiments, each of these subcomponents of the microcontroller 702 and CHub 716 may be different with each choice or type of CPU core 704. The Chub 716 may also be coupled to shared SRAM 726 and an SPC (system performance controller) 728. The private SRAM 712 is independent of the shared SRAM 726 that is accessed by the microcontroller 702 through the bridge 718. The CPU core 704 accesses the private SRAM 712 without going through the bridge 718, thus allowing local register and RAM accesses to occur simultaneously with DMA access to shared SRAM 726. Although labeled here as SRAM, these memory modules may be any suitable type of a wide variety of (volatile or non-volatile) memory or data storage modules in various other embodiments.

In various embodiments, the programmable core 724 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 724 includes a GPIO (general purpose IO) and EMIF (extended memory interface) block 730 to provide a mechanism to extend the external off-chip access of the microcontroller 702, a programmable digital block 732, a programmable analog block 734, and a special functions block 736, each configured to implement one or more of the subcomponent functions. In various embodiments, the special functions block 736 may include dedicated (non-programmable) functional blocks and/or include one or more interfaces to dedicated functional blocks, such as USB, a crystal oscillator drive, JTAG, and the like.

The programmable digital block 732 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital block 732 may be configured to perform various digital functions, including, but not limited to, one or more of the following functions: a basic I2C slave; an I2C master; a SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 704) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× oversampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 734 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 134 may support various analog functions including, but not limited to, analog routing, LCD drive IO support, capacitive sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
receiving at a first resource of an integrated circuit a first signal from a fixed function block via a programmable connection, wherein receiving the first signal includes bypassing a programmable logic array;
receiving at a second resource of the integrated circuit a second signal from the fixed function block via the programmable connection, wherein the second signal is received at the programmable connection via the programmable logic array, the programmable logic array comprising at a plurality of programmable logic circuits programmably interconnected to perform one or more functions.

2. The method of claim 1 wherein the first signal is an interrupt request received at a first interrupt input of an interrupt controller and the second signal is an interrupt request received at a second interrupt input of the interrupt controller.

3. The method of claim 2, wherein the first signal is received at a first direct memory access (DMA) input of a DMA controller and where the second signal is received at a second DMA input of the DMA controller.

4. The method of claim 1, wherein the integrated circuit comprises an interrupt controller or a direct memory access controller.

5. The method of claim 1, wherein the first and second resources are of a fixed number or resources provided by the integrated circuit, wherein two or more of the fixed resources are allocated to signals from fixed functions blocks and a remainder of the fixed number of resources is allocated to signals from programmable function blocks.

6. The method of claim 1 further comprising reallocating at least one of the first and second resources to another fixed function block.

7. A routing apparatus comprising:
an interface system coupleable to a fixed function block, a programmable function block and one or more controllers;
a programmable logic array, wherein the programmable logic array is configured to receive a first request from the fixed function block, a first request resource allocated by the programmable logic array to requests from the fixed function block, receive a second request from the programmable function block, and transfer the second request to a second request resource of the one or more controllers, the second request resource allocated by the programmable logic array to requests from the programmable function block, wherein the programmable function block comprises a plurality of circuits programmably interconnected to provide one or more functions; and
a programmable connection configured to receive the first request and the second request, select between the first request and the second request, and transfer the first request to a first request resource of one or more controllers to allow the first request to bypass the programmable logic array.

8. The routing apparatus of claim 7, wherein the one or more controllers comprise an interrupt controller including a number of interrupt inputs, wherein the first request includes a first interrupt request and the second request includes a second interrupt request, wherein the programmable connection is configured to transfer the first interrupt request to a first interrupt input of the number of interrupt inputs and the programmable logic array is configured to transfer the second interrupt request to a second interrupt input of the number of interrupt inputs.

9. The routing apparatus of claim 7, wherein the one or more controllers comprises a direct memory access (DMA) controller including number of DMA inputs, wherein the first request includes a first DMA request and the second request includes a second DMA request, wherein the programmable connection is configured to transfer the first DMA request to a first DMA input of the number of DMA inputs and the programmable routing logic is configured to transfer the second DMA request to a second DMA input of the number of DMA inputs.

10. The routing apparatus of claim 7, wherein the one or more controllers comprises an interrupt controller and a direct memory access controller.

11. The routing apparatus of claim 7, wherein the first request resource and the second request resource belong to a set of request resources provided by the one or more controllers, wherein a portion of the set of request resources are allocated to requests from fixed function blocks and a remaining portion of the set of request resources are allocated from programmable function blocks.

12. The routing apparatus of claim 11, wherein the programmable logic array includes one or more multiplexers configured to select between the requests from fixed functions blocks and the requests from the programmable function blocks.

13. The routing apparatus of claim 11, wherein the programmable routing array is configured to reallocate at least one of the first resource and second resource to another fixed function block.

14. A system comprising:
a fixed function block;
a programmable function block;
one or more controllers;
a programmable logic array, wherein the programmable logic array is configured to receive a first request from the fixed function block, a first request resource allocated by the programmable logic array to requests from the fixed function block, receive a second request from the programmable function block, and transfer the second request to a second request resource of the one or more controllers, the second request resource allocated by the programmable logic array to requests from the programmable function block, wherein the programmable function block comprises a plurality of circuits programmably interconnected to provide one or more functions; and
a programmable connection configured to receive the first request and the second request, select between the first request and the second request, and transfer the first request to a first request resource of one or more controllers to allow the first request to bypass the programmable logic array.

15. The system of claim 14, wherein the one or more controllers comprise an interrupt controller including a number of interrupt inputs, wherein the first request includes a first interrupt request and the second request includes a second interrupt request, wherein the programmable connection is configured to transfer the first interrupt request to a first interrupt input of the number of interrupt inputs and the programmable logic array is configured to transfer the second interrupt request to a second interrupt input of the number of interrupt inputs.

16. The system of claim 14, wherein the one or more controllers comprises a direct memory access (DMA) controller including number of DMA inputs, wherein the first request includes a first DMA request and the second request includes a second DMA request, wherein the programmable connection is configured to transfer the first DMA request to a first DMA input of the number of DMA inputs and the programmable routing logic is configured to transfer the second DMA request to a second DMA input of the number of DMA inputs.

17. The system of claim 14, wherein the one or more controllers comprises an interrupt controller and a direct memory access controller.

18. The system of claim 14, wherein the first request resource and the second request resource belong to a set of request resources provided by the one or more controllers, wherein a portion of the set of request resources are allocated to requests from fixed function blocks and a remaining portion of the set of request resources are allocated from programmable function blocks.

19. The system of claim 18, wherein the programmable logic array includes one or more multiplexers configured to select between the requests from fixed functions blocks and the requests from the programmable function blocks.

20. The system of claim 18, wherein the programmable routing array is configured to reallocate at least one of the first resource and second resource to another fixed function block.

* * * * *